United States Patent
Staba

[11] 3,870,204
[45] Mar. 11, 1975

[54] APPARATUS FOR THE AUTOMATIC CHARGING OF PRIMER MIX

[76] Inventor: Edward A. Staba, Killingworth Rd., Higganum, Conn. 06441

[22] Filed: Mar. 25, 1974

[21] Appl. No.: 454,053

Related U.S. Application Data

[63] Continuation-in-part of Ser. No. 253,481, May 15, 1972, Pat. No. 3,820,578.

[52] U.S. Cl. .............................. 222/262, 222/349
[51] Int. Cl. ............................................. G01f 11/00
[58] Field of Search .......... 222/345, 349, 362, 370, 222/337, 262, 347

[56] References Cited
UNITED STATES PATENTS

| | | | |
|---|---|---|---|
| 1,605,832 | 11/1926 | Garhart | 222/337 X |
| 3,190,498 | 6/1965 | Bayha | 222/262 X |

Primary Examiner—Allen N. Knowles
Attorney, Agent, or Firm—Donald R. Motsko; H. Samuel Kieser; William W. Jones

[57] ABSTRACT

An automated primer mix extruding mechanism for extruding a charge of priming material into a measuring chamber and transferring the measured charge to a point remote from the extruder.

2 Claims, 1 Drawing Figure

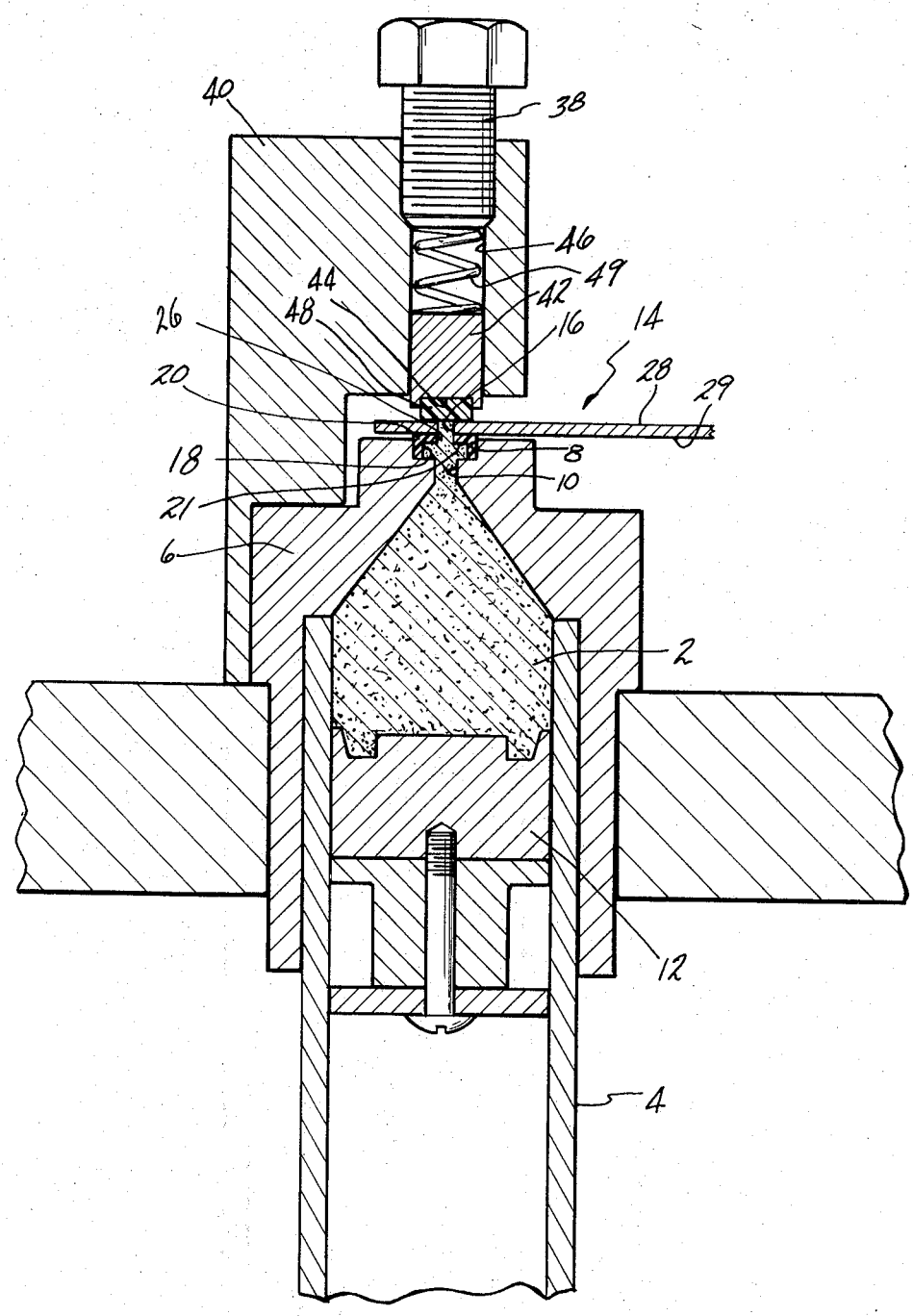

APPARATUS FOR THE AUTOMATIC CHARGING OF PRIMER MIX

This application is a continuation-in-part of my copending application Ser. No. 253,481, filed May 15, 1972, now U.S. Pat. No. 3,820,578.

This invention relates to an improvement in apparatus for extruding measured charges of an extrudable priming mixture into a measuring chamber, and transferring the measured charges of priming material to a primer container in which they are deposited. The improvement disclosed herein relates to a grommet which defines the extrusion orifice and which is used in conjunction with an extruder and other apparatus disclosed in my copending application Ser. No. 253,481, filed May 15, 1972 now U.S. Pat. No. 3,820,578, the disclosure of which is specifically incorporated hereinto by reference.

It has been determined that the use of a grommet to form the extrusion orifice of an extruder for extrudable priming mix is very advantageous since the extrudable priming mix is a very abrasive material which tends to cut and score the face of the extruder. This is particularly true when the extrusion is made into a measuring chamber which is formed in a movable member of the type disclosed in my copending application Ser. No. 253,481 referred to above.

When the extrudable priming mix is extruded into a chamber or cavity in a movable member, termed a transfer member, which member moves the measuring chamber or cavity from the extruder to a point offset therefrom where the measured charge of primer is transferred from the chamber to a primer container such as a cartridge or a primer cup, it is important to seal the interface between the extrusion orifice and the transfer member so that none of the priming mixture can ooze around the extruder and be deposited on the surface of the transfer member or on the face of the extruder. The need for such a seal is to prevent the priming mix from drying out on the apparatus surfaces where, due to its combustible nature, it would present a hazard. In the present improvement, the seal is provided by placing the extrusion orifice grommet in a recess in the extrusion block and letting the grommet float free in the recess. The pressurized priming mix, as it is being extruded through the grommet orifice, pushes on the grommet so that the grommet is forced into sealing engagement with the adjacent surface of the transfer member around the measuring chamber. By free floating the grommet, the sealing force pushing the grommet against the transfer member is directly proportional to the extrusion pressure of the priming mix, so that rises in extruding pressure will be automatically compensated for in terms of sealing pressure.

It is therefore, an object of this invention to provide an apparatus for extruding an extrudable priming mix into a measuring chamber in a movable transfer member, which apparatus includes a grommet forming the extrusion orifice.

It is a further object of this invention to provide an apparatus of the character described wherein the grommet is positioned within a recess in an extrusion block so as to be freely floating therein.

These and other objects and advantages of the apparatus of the present invention will be more readily apparent from the following detailed description of an embodiment of the invention taken in conjunction with the accompanying drawing, which is a sectional view of an apparatus formed in accordance with this invention, which view is taken axially of the priming mix extruder.

Referring to the drawing, there is shown a mass of extrudable primer mix 2 which is contained in a tubular receptacle 4. The receptacle 4 is telescopingly mounted in an extrusion block 6. The extrusion block is provided with an outlet passage 10 through which the priming mix is caused to flow under pressure applied thereto by a ram 12 slidably mounted in the tubular receptacle 4. Extrusion pressure is preferably applied to the ram in the form of pneumatic pressure provided by a source thereof (not shown). The outlet passage 10 is provided with an enlarged counterbore 8 in which there is positioned a grommet 20. The grommet 20 is free floating within the counterbore 8. The grommet 20 is cup-shaped and includes an internal side surface 18 which is larger than the extrusion orifice 26 which extends through the bottom wall 21 of the grommet 20.

A primer measuring and transfer member 14 is movably mounted adjacent to the extrusion block 6, the transfer member 14 preferably taking the form of a movable planar dial 28 having at least one and preferably a plurality of through passages 16 formed therein. The passages 16 form the measuring chambers into which a predetermined amount of priming mixture is extruded. On the side of the dial 28 away from the extrusion orifice 26, there is disposed a pad 48 mounted in a recess 44 in the end wall of a plug 42. The plug 42 is slidably mounted in a bore 46 in a block 40 and is biased toward the dial 28 by a spring 49. The biasing force of the spring 49 can be varied by an adjusting screw 38. The pad 48 is preferably made of polytetrafluoroethylene or other material to which the priming mix has a low propensity to adhere. The pad 48, it will be noted, closes the end of the passage 16 away from the extrusion orifice 26. The pad 48 will permit air to escape from the passage 16 as primer mix is extruded thereinto, but will prevent the primer mix from flowing out of the passage 16.

The grommet 20, as previously noted, is free floating within the counterbore 8. Thus the pressure of the priming mix is applied to the grommet 20 to force the latter into snug engagement with the surface 29 of the dial 28. The grommet 20 will thus stay in snug engagement with the dial surface 29 despite surface irregularities which might be present, or despite mounting irregularities of the dial 28 with respect to its hub (not shown) about which it rotates. Thus some latitude is permitted with respect to the perpendicularity of the dial 28 and its rotational axis. A further advantage of using a free floating grommet resides in the fact that the sealing force between the grommet 20 and dial surface 29 is directly proportional to the extrusion pressure. Thus if there is a surge of extrusion pressure, this will be automatically compensated for by an increase in the sealing force of the grommet. For preferred sealing effect and low friction generation, the grommet 20, or at least the surface thereof which engages the dial surface 29, should be formed from a polymeric material, either natural or synthetic. Since the priming mix is abrasive, it will tend to abrade or score the outer surface of the grommet when the dial 28 is rotated to bring a new passage 16 into position for filling. This abrading action requires periodic replacement of the grommet so that the sealing effect is maintained. Thus use of the free floating grommet enables quick replacement to be made without breaking down the entire assembly.

It will thus be readily appreciated that use of a free floating grommet in a priming mix extrusion assembly of the character described results in easy grommet replacement when signs of wear appear. Another advantage to the free floating grommet lies in its ability to maintain a seal between the extrusion orifice and transfer dial despite extrusion pressure variations and surface and mounting irregularities associated with the transfer dial.

Since many changes and variations of the disclosed embodiment of the invention may be made without departing from the inventive concept, it is not intended to limit the invention otherwise than as required by the appended claims.

What is claimed is:

1. An apparatus for automatically forming a precisely measured charge of an extrudable priming composition, said apparatus comprising:
   a. extrusion means for extruding the priming composition through an orifice, said extrusion means including an extrusion block having a cavity, a grommet freely movably mounted in said cavity, said grommet having a bore therethrough forming the orifice;
   b. transfer means for transferring a predetermined volume of the priming composition from said extrusion means to a point offset therefrom, said transfer means including means forming at least one measuring chamber for containing a measured amount of the priming composition, said transfer means being disposed in sliding engagement with an outer surface of said grommet and said grommet being biased into snug engagement with said transfer means by pressure applied to said grommet by the priming composition; and
   c. means for moving said transfer means to move said measuring chamber from a position aligned with said orifice to a position offset from said orifice and return.

2. The apparatus of claim 1, where in at least said outer surface of said grommet is formed from suitable polymeric material.

* * * * *